April 17, 1951     G. B. CULBERTSON     2,548,873
FLUID COUPLING
Filed Aug. 2, 1944
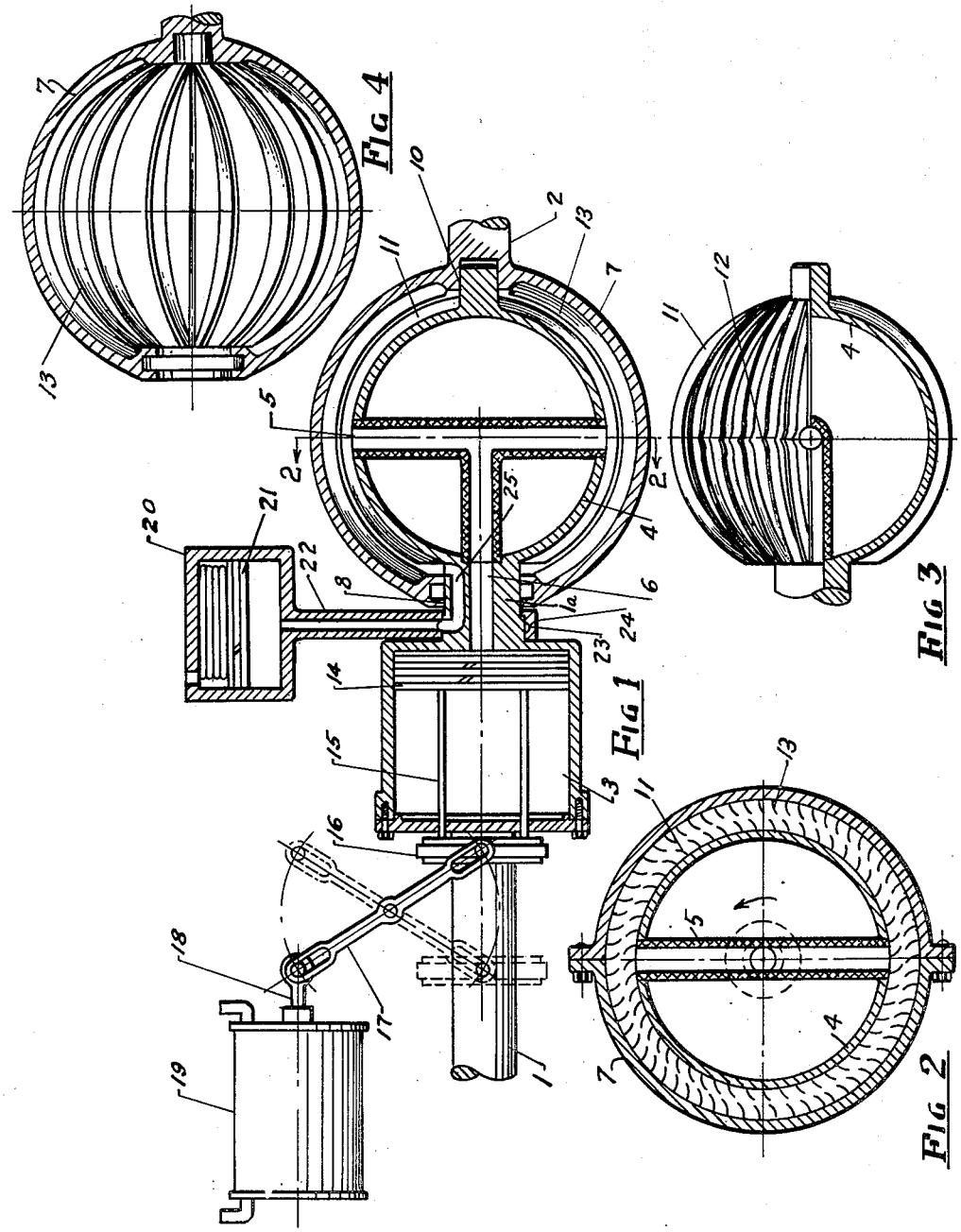
Inventor
Glenn B. Culbertson
By F. L. Walker, Attorney Patented Apr. 17, 1951

2,548,873

UNITED STATES PATENT OFFICE 2,548,873

FLUID COUPLING

Glenn B. Culbertson, Dayton, Ohio

Application August 2, 1944, Serial No. 547,724

9 Claims. (Cl. 192—58)

This invention pertains to a fluid drive coupling or power transmission unit, and more particularly to a variable speed driving mechanism of the hydraulic turbine type, for motor vehicles, power boats and analogous installations, and also applicable to stationary power drive installations.

In the present instance, there is contemplated a variable speed hydraulic drive mechanism, wherein the driving and driven elements are maintained in relation for rotation in a common plane, the relative rate of rotation of which is varied by increasing or decreasing the quantity of motive fluid admitted therebetween.

The object of the invention is to improve the construction as well as the means and mode of operation of fluid drive transmission mechanisms, whereby they may not only be economically manufactured, but will be more efficient in use, uniform in operation, quickly responsive to fluctuations of motive fluid control, having relatively few operating parts, and be unlikely to get out of repair.

A further object of the invention is to provide a fluid driving clutch of great flexibility, capable of progressive variation through small power increments from approximately zero driving influence to maximum positive driving action thereof.

A further object of the invention is to provide means for utilizing centrifugal influence for effecting uniform distribution of the motive fluid supply to the driving and driven elements.

A further object of the invention is to provide an improved form of vane exerting a distributing influence upon the centrifugally discharged motive fluid.

A further object of the invention is to provide improved complementary forms of driving and driven elements concentrically arranged for unison rotation in a common plane at variable speeds.

A further object of the invention is to provide an improved regulatory means for the motive fluid by which the motive fluid is progressively withdrawn and returned to the driving and driven elements to correspondingly vary the relative rotation thereof.

A further object of the invention is to provide a fluid power transmission unit having the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawings, wherein is illustrated the preferred but obviously not the only form of embodiment of the invention, Fig. 1 is a longitudinal sectional view of an assembled fluid drive transmission unit embodying the present invention.

Fig. 2 is a transverse sectional view on line 2—2 of Fig. 1.

Fig. 3 is a side elevation of the driving element disassembled from the unit.

Fig. 4 is a sectional interior view of the shell or driven element removed from the assembly.

Like parts are indicated by similar characters of reference throughout the several views.

In the drawings, 1 indicates the driving shaft, which may be the power shaft of an engine or motor of any construction, while 2 is the driven shaft disposed in axial alignment with the driving shaft 1 but capable of differential rotation relative thereto, or of unison rotation therewith. Interposed in the drive shaft 1 and forming a rotary portion thereof, is a cylinder 3 which is connected by a hollow shaft continuation 1a with a spherical impeller 4. The impeller 4 may be solid, but is preferably of hollow construction. Radially disposed within the spherical impeller in the equatorial plane thereof is a series of tubular conduits 5—5, which at their inner ends communicate through an axial conduit 6 common thereto and through the hollow shaft extension 1a with the cylinder 3.

The spherical impeller 4 is enclosed within a spherical shell 7, which comprises the driven member of the unit to which is attached the driven shaft 2. The driven member, or spherical shell 7, is journaled at 8 upon the hollow shaft extension 1a for independent rotation thereabout. The impeller 4 is provided with a journal bearing 10 within the shell or driven member 7 in axial alignment with the driven shaft 2.

The impeller 4 and driven member or shell 7 are concentrically disposed in relatively spaced relation for rotation about a common axis coincident with that of the driving and driven shafts 1 and 2. Within the intervening space between the exterior of the sperical impeller 4 and driven shell 7 there are disposed a series of peripherally spaced meridional vanes 11 extending substantially from one axial pole to the other of the spherical impeller, as shown in Fig. 3. These impeller vanes 11 are provided with medial angular deflections 12, the apices of which are extended in the direction of rotation of the impeller. Disposed about the interior of the driven member or shell 7 is a complementary series of relatively spaced meridianal vanes 13. These vanes 13, as shown in Fig. 4, are devoid of the medial deflections or angular bights. The vanes 11 and 13 are of such depth radially that while they freely pass each other during differential rotation of the driving and driven elements, when in registering relation they occupy substantially the full radial depth of the intervening concentric space between the respective members 4 and 7. The space is thus divided by the cooperation of the respective sets of vanes into a series of motive fluid receiving spaces or "buckets." The motive fluid is supplied in regulated volume to the spaces between the vanes or buckets of the driving and driven members from the reservoir cylinder 3 and subsequently withdrawn therefrom in quantities proportionate to desired fluctuations of differential speed of the impeller and shell by to and fro adjustment of a reciprocatory piston 14 within the cylinder 3. The cylinder 3, as before mentioned, is connected to and rotates with the drive shaft 1. The piston 14 is axially movable therein under influence of a pair of parallel spaced piston rods 15 extending through the head of the cylinder 3 at opposite sides of the drive shaft 1, and are connected to a shift collar 16 mounted on the drive shaft. The shift collar is movable to and fro by any suitable means to actuate the piston. For illustrative purpose the shift collar is shown connected to an oscillatory adjusting lever 17 which in turn is connected to the piston rod 18 of a fluid pressure cylinder 19 for to and fro actuation. Upon movement of the fluid reservoir piston 14 toward the right, where it is shown in Fig. 1, the motive fluid is forced under pressure from the cylinder 3 through the hollow shaft extension 1a and the connected axial conduit 6 to the radial fluid distributing conduits 5—5. The impeller being in rotation incident to rotation of the driving shaft 1, the motive fluid is discharged radially through the conduits 5—5 under centrifugal influence into the space between the impeller 4 and driven shell 7, and is received into the "bucket" spaces between the vanes 11 and 13.

As the motive fluid enters the bucket spaces between the impeller body and the shell from the radially spaced outlets of the distributing conduits 5—5, the V-shaped medial configurations 12 of the faster moving impeller vanes 11 as they pass the shell vanes 13 tend to divert the motive fluid supply laterally toward the axial poles of the driving and driven members. So long as the spaces are not filled with fluid, restricted rotation of the impeller vanes 11 past the shell vanes 13 will be permitted.

If the "bucket" spaces between the vanes are completely filled with motive fluid, the contained fluid will resist relative movement of the impeller vanes 11 past the vanes 13 of the driven member, and prevent interchange of fluid from one "bucket" space to another. Consequently, the driving and driven elements will be locked together by the resistance of the fluid and the driving and driven members will be caused to rotate in unison.

Upon retraction of the fluid reservoir piston 14 toward the left of Fig. 1, a proportionate amount of motive fluid will be withdrawn from the "bucket spaces" intermediate the impeller body 4 and the driven shell to enable proportionately greater or less relative rotation of said members.

To enable escape of air displaced from the intervening space between the impeller or driving member 4 and the driven member 7 by entry of the fluid, and for automatic replacement of the air content upon withdrawal of the fluid from said space, there is provided an auxiliary air reservoir 20 wherein the air content is subjected to influence of a spring pressed piston 21. The auxiliary reservoir is connected by a conduit 22 with an annular groove 23 in a bearing 24 surrounding the hollow shaft extension 1a. Communicating with the auxiliary supply conduit 22 is a passage 25 in the hollow shaft extension, the opposite end of which also communicates with the "bucket" space between the driving and driven members.

When the vehicle is at rest with the motor idling, substantially all the motive fluid is withdrawn from the "bucket" space between the driving and driven members and the impeller rotates freely within the shell. When starting the vehicle, and so long as low speed only is desired, the reservoir piston 14 is adjusted to force a small quantity of fluid from the reservoir cylinder 3 into the intermediate space between the driving and driven members.

The impeller 4 being in rotation, the small quantity of motive fluid introduced between the vanes will afford sufficient resistance to free movement of the vanes 11 of the impeller past the vanes 13 of the driven member to impart movement to the latter, but with considerable slippage.

As the reservoir piston 14 is gradually adjusted to progressively increase the quantity of motive fluid introduced into the "bucket" spaces intermediate the driving and driven members, the motive fluid will flow less freely from one such space to the next as the driving and driven members rotate, and less slippage will occur. Hence, the latter will be actuated at an increased speed. When, however, the bucket spaces between the respective rotary members are substantially filled, the resistance to relative rotation increases and slippage is minimized, thereby causing the driving and driven members to rotate in unison, transmitting driving power positively from the driving shaft 1 to the driven shaft 2. By minutely varying the adjustment of the reservoir piston 14, the rotation of the driven shell may be minutely varied to progressively increase or decrease the rate of rotation of the driven shaft 2.

The fluid drive transmission unit thus described is usable in conjunction with a conventional reversing mechanism and other drive connections ordinarily employed in motor vehicle and other installations.

The fluid is supplied under pressure of the piston 14 to the space intermediate the driving and driven members. The air content displaced therefrom by entry of the fluid escapes through the passage 25, the groove 23 and conduit 22 into the reservoir 20 against the yielding resistance of the spring pressed piston 21. Upon withdrawal of any portion of the fluid to correspondingly reduce the relative speed of rotation of the driven member, the spring pressed piston 21 operates automatically to restore to the space a compensating quantity of air. Thus, fluid and air are alternately supplied to the intervening space and exhausted therefrom to correspondingly vary the retarding effect of the fluid upon the relative speed of rotation of the driven member.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A variable fluid power transmission, including revoluble driving and driven shafts, a spherical revoluble impeller connected with the driving shaft for unison rotation, a spherical revoluble shell concentrically enclosing the spherical impeller in spaced relation therewith and connected to the driven shaft for unison rotation, two series of cooperating vanes within the space between the spherical impeller and the enclosing spherical shell, comprising a series of relatively spaced vanes carried upon the exterior surface of the impeller and a series of spaced vanes carried upon the interior surface of the concentric enclosing shell, radially disposed discharge ports in the spherical impeller through which actuating fluid is centrifugally discharged into the space intermediate the impeller and shell and between the vanes therein, a supply reservoir for actuating fluid, conduits leading therefrom to the discharge ports, including radial conduits in the spherical impeller, and piston means movable in said reservoir for optionally varying the quantity of actuating fluid supplied thereto.

2. A variable fluid power transmission, including revoluble driving and driven shafts, a spherical impeller connected with the driving shaft for unison rotation, a spherical revoluble shell concentrically enclosing the spherical impeller in relatively spaced relation and connected to the driven shaft for unison rotation, relatively spaced vanes upon the exterior surface of the impeller and interior surface of the concentric enclosing shell, a supply reservoir for actuating fluid, a conduit interconnecting the supply reservoir with the space intermediate the impeller and enclosing shell, a movable piston in the supply reservoir, which by its adjustment regulates the quantity of fluid supplied to the said intermediate space, an air reservoir also communicating with said space to receive under pressure air displaced therefrom by the entry of fluid into said space, the construction and arrangement being such that the fluid within the space retards the relative travel movement of the impeller vanes past the vanes carried by the shell, proportionately to the amount of fluid admitted to the intermediate space.

3. A variable fluid power transmission, including concentric revoluble inner driving and outer driven members, spaced apart to afford an intervening concentric space, spaced vanes on the peripheral surface of the driving member and the interior face of the surrounding driven member, driving and driven shafts connected with the respective members, means for discharging fluid into the space between the driving and driven members and between the vanes carried thereby for retarding the relative rotation thereof, including radially disposed conduits in the driving member, peripheral discharge ports communicating with the intermediate space and with which the radial conduits communicate, a supply reservoir for fluid with which the radial conduits also communicate, means for displacing variable quantities of fluid from the reservoir through the conduits to said intermediate space and returning it thence back to the reservoir, and an air reservoir also communicating with said intermediate space receiving therefrom under pressure the air displaced therefrom by entry of the fluid.

4. A fluid power transmission unit, including relatively spaced spherical concentric driving and driven members, a drive shaft connected with the inner spherical driving member, a driven shaft connected with the exterior spherical driven member, a rotary fluid supply reservoir wherein fluid is subjected to alternate pressure and suction influence, a closed conduit for motive fluid leading from the reservoir to the driving member, including radially disposed branch conduits in the driving member through which fluid is discharged into the space intermediate the concentric spherical driving and driven members, a double series of complementary meridional vanes extending from one axial pole to the other of the driving and driven members within the space therebetween in which a greater or less quantity of fluid is collected to retard relative rotation of the driving and driven members, and an air accumulator communicating with said space to compel withdrawal of motive fluid from said space in proportion to the suction influence exerted in said supply reservoir.

5. A fluid power transmission, including relatively spaced concentric inner driving and outer driven members, driving and driven shafts connected with the corresponding members, vanes within the intermediate space between the said concentric members upon the exterior face of the inner driving member and the interior face of the outer driven member, means for supplying variable quantities of fluid to the space between the concentric members, and an air reservoir connected therewith wherein air displaced from said space by entrance of fluid is received, and pressure means for maintaining the air within said reservoir under pressure.

6. A variable fluid power transmission, including driving and driven members, vanes carried thereby, fluid receiving pockets formed by the vanes, pressure means for supplying a variable quantity of fluid to the said pockets to variably retard the relative rotation of the driving and driven members, an air reservoir receiving from said pockets air displaced therefrom by entry of fluid thereinto, and additional pressure means for returning the air thereto upon proportionate reduction of the variable quantity of fluid therein.

7. A variable fluid power transmission, including relatively revoluble driving and driven members, means for alternately supplying thereto and withdrawing variable quantities of fluid for variably retarding the relative rotation of the driving and driven members, an air reservoir receiving through the driving member air displaced from the driving and driven members, and additional means for automatically returning air thereto upon withdrawal of the liquid supply.

8. A variable power transmission unit, including relatively revoluble driving and driven members, a rotary fluid reservoir rotating in unison with the driving member, means for supplying to the driving and driven members and withdrawing therefrom variable quantities of fluid for variably retarding the degree of relative rotation of the driving and driven members, an air reservoir receiving therein air displaced by the fluid and supplying to the driving and driven members air to replace the fluid withdrawn therefrom, the construction and arrangement being such that proportionate quantities of fluid and air are alternately supplied to and withdrawn from the driving and driven members to correspondingly vary the degree of relative rotation of the said members.

9. A variable fluid power transmission unit, including concentric relatively spaced inner and outer driving and driven members, relatively spaced meridional vanes disposed within the medial space between said members, including one series thereof carried upon the exterior face of the inner member and another series thereof carried upon the inner face of the outer member, and means for supplying and exhausting variable quantities of fluid and air alternately to and from said space to correspondingly retard or increase the degree of relative rotation of the driving and driven members.

GLENN B. CULBERTSON.

REFERENCES CITED

The following references are of record in the file of this patent:

UNITED STATES PATENTS

| Number | Name | Date |
|---|---|---|
| 864,724 | Brown | Aug. 27, 1907 |
| 979,272 | Feller | Dec. 20, 1910 |
| 1,192,233 | Severy | July 25, 1916 |
| 1,449,499 | Davis | Mar. 27, 1923 |
| 1,552,194 | Banning | Sept. 1, 1925 |
| 1,653,360 | Howard | Dec. 20, 1927 |
| 1,957,124 | Yahn | May 1, 1934 |
| 1,963,720 | Sinclair | June 19, 1934 |
| 2,006,136 | Grimsley | June 25, 1935 |
| 2,110,454 | Sinclair | Mar. 8, 1938 |
| 2,179,519 | Popper | Nov. 14, 1939 |
| 2,195,901 | Owens | Apr. 2, 1940 |
| 2,299,883 | Dunn | Oct. 27, 1942 |
| 2,301,037 | Greene | Nov. 3, 1942 |
| 2,395,047 | Hanson | Feb. 19, 1946 |

FOREIGN PATENTS

| Number | Country | Date |
|---|---|---|
| 67,202 | Sweden | Apr. 16, 1929 |
| 237,210 | Great Britain | Sept. 24, 1925 |